(12) United States Patent
Monga et al.

(10) Patent No.: US 10,033,625 B2
(45) Date of Patent: Jul. 24, 2018

(54) LOOP AVOIDANCE IN REPEATER NETWORKS

(71) Applicant: MediaTek Singapore Pte. Ltd., Singapore (SG)

(72) Inventors: Raghav Monga, Chandigarh (IN); Amit Kumar Shakya, New Delhi (IN); Prakhar Vig, Ghaziabad (IN); Hasan Ali Stationwala, Indore (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 48 days.

(21) Appl. No.: 15/371,211

(22) Filed: Dec. 7, 2016

(65) Prior Publication Data
US 2017/0085465 A1    Mar. 23, 2017

(51) Int. Cl.
| H04L 12/28 | (2006.01) |
|---|---|
| H04L 12/705 | (2013.01) |
| H04L 29/12 | (2006.01) |
| H04L 12/715 | (2013.01) |
| H04J 1/16 | (2006.01) |

(52) U.S. Cl.
CPC ............ *H04L 45/18* (2013.01); *H04L 45/04* (2013.01); *H04L 61/2038* (2013.01); *H04L 61/6022* (2013.01)

(58) Field of Classification Search
USPC ................. 370/254, 256, 389, 329, 386
See application file for complete search history.

(56) References Cited

U.S. PATENT DOCUMENTS

2015/0304349 A1*  10/2015  Bernstein ............ H04L 63/1425
                                                                                      726/22

* cited by examiner

*Primary Examiner* — John Pezzlo
(74) *Attorney, Agent, or Firm* — Han IP Corporation; Andy M. Han

(57) ABSTRACT

A technique for loop avoidance in repeater networks involves a first repeater, having a first node number or a first weight, connecting to a second repeater with the second repeater being a child node of the first repeater. The first repeater assigns a second node number or the first weight to the second repeater. At least a portion of the second node number of the second repeater includes the first node number of the first repeater. At least a portion of the first node number includes a node number that is an identification unique to one of a plurality of repeaters as a root node in a tree structure formed by at least some of the repeaters including the first and the second repeaters. Loops may be avoided by comparing the weights of two nodes in a repeater network that attempt to establish connection between nodes having the same weight.

21 Claims, 9 Drawing Sheets

LOOP AVOIDANCE IN REPEATER NETWORKS

TECHNICAL FIELD

The present disclosure is generally related to computer networking and, more particularly, to loop avoidance in repeater networks.

BACKGROUND

Unless otherwise indicated herein, approaches described in this section are not prior art to the claims listed below and are not admitted to be prior art by inclusion in this section.

In computer networking, a repeater is an electronic device that receives a signal and retransmits the signal at a higher level or higher power so that the signal can be received at a long distance away. Repeaters are devices that can function as both an access point (AP) and a station (STA) (or as both a host and a client), denoted as "repeater_AP" and "repeater_STA" herein, respectively. As a client or repeater_STA, the repeater functions strictly on a channel of repeater_AP, and can connect to another AP and/or repeater_AP. As a host or repeater_AP, a repeater can allow association from other STA's and repeater_STA's. Accordingly, connections between different repeaters can result in mixed topologies such as daisy chain (or line), star, mesh, ring, bus, and so on. FIG. 7 illustrates an example scenario 700 of some possible topologies of repeater networks. Undesirably, in some cases, a loop between repeaters can be formed, as illustrated in FIG. 8. Referring to FIG. 8, a loop is formed in a daisy chain (or line) topology, as shown in a first scenario 800A, and a loop is formed in a star topology, as shown in a second scenario 800B.

Existing solutions that attempt to address looping in repeater networks include a Spanning Tree protocol at Layer 3 and/or Layer 4. A problem with this approach is that it allows a loop-resulting connection to occur first to detect the existence of the resultant loop, and then breaks the loop by blocking the interface. However, this approach requires additional overhead in detecting and breaking loops.

Moreover, loops can be formed in a dual-band network with multiple repeaters. For example, when multiple clients or repeater_STA's on the 2.4 GHz and 5 GHz bands connect to different hosts or repeater_AP's, it is likely that loops would be formed. FIG. 9 illustrates an example scenario 900 of loops formation in a dual-band network of repeaters. Loops need to be avoided as they can choke the network.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose a novel scheme that avoids loop in repeater networks without the overhead issue associated with existing solutions. The proposed scheme allows a node to find its position in a tree structure (hereinafter interchangeably referred as a "tree") as well as a number of hops to the root node of the tree, with the root node being a node that provides node number and weight to all the nodes in the respective tree structure (and network). The proposed scheme also allows reconnection of a node in a tree. The proposed scheme also avoids loop formation in dual-band networks. Specifically, the proposed scheme detects whether a loop would be formed before an actual connection is made, and prevents the connection to avoid loop formation. The proposed scheme also handles loop avoidance for link failover and roaming scenarios in dual-band communication devices. For instance, loop avoidance may be achieved based on the weight of the network. Moreover, loop avoidance may be achieved at the time of roaming based on node numbers.

In one aspect, a method may involve a first communication device (e.g., a first repeater) of a plurality of communication devices (e.g., multiple repeaters) connecting to a second communication device (e.g., a second repeater) of the plurality of communication devices, with the second communication device being a child node of the first communication device. The first communication device may have a first node number. The method may also involve the first communication device assigning a second node number to the second communication device. At least a portion of the second node number of the second communication device may include the first node number of the first communication device. At least a portion of the first node number may include a root node number that is an identification unique to one of the plurality of communication devices as a root node in a tree structure formed by at least some of the plurality of communication devices including the first and the second communication devices. The root node may be the first communication device or another communication device of the plurality of communication devices.

In another aspect, a method may involve a first communication device (e.g., a first repeater) of a plurality of communication devices (e.g., multiple repeaters) disconnecting from a third communication device (e.g., a third repeater) of the plurality of communication devices, with the first communication device being a child node of the third communication device. The method may also involve the first communication device assigning a first node number to the first communication device. The method may further involve the first communication device assigning a second node number to a second communication device, with the second communication device being a child node of the first communication device. At least a portion of the second node number of the second communication device may include the first node number of the first communication device. The first node number may include an identification unique to the first communication device.

In another aspect, an apparatus may be implementable in a first communication device (e.g., a first repeater) of a plurality of communication devices (e.g., multiple repeaters). The apparatus may include a memory and a processor. The memory may be capable of storing a first node number associated with the first communication device and one or more instructions. The processor may be coupled to access the memory to execute the one or more instructions such that, upon executing the one or more instructions, the processor may be configured to perform a number of operations. The processor may establish a connection with a second communication device of the plurality of communication devices with the second communication device being a child node of the first communication device. The processor may also assign a second node number to the second communication device. At least a portion of the second node number of the second communication device may include the first node number of the first communication device. At least a portion of the first node number may include a root node number that is an identification unique to one of the plurality of communication devices as a root node in a tree structure formed by at least some of the plurality of communication devices including the first and the second communication devices. The root node may be the first communication device or another communication device of the plurality of communication devices.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
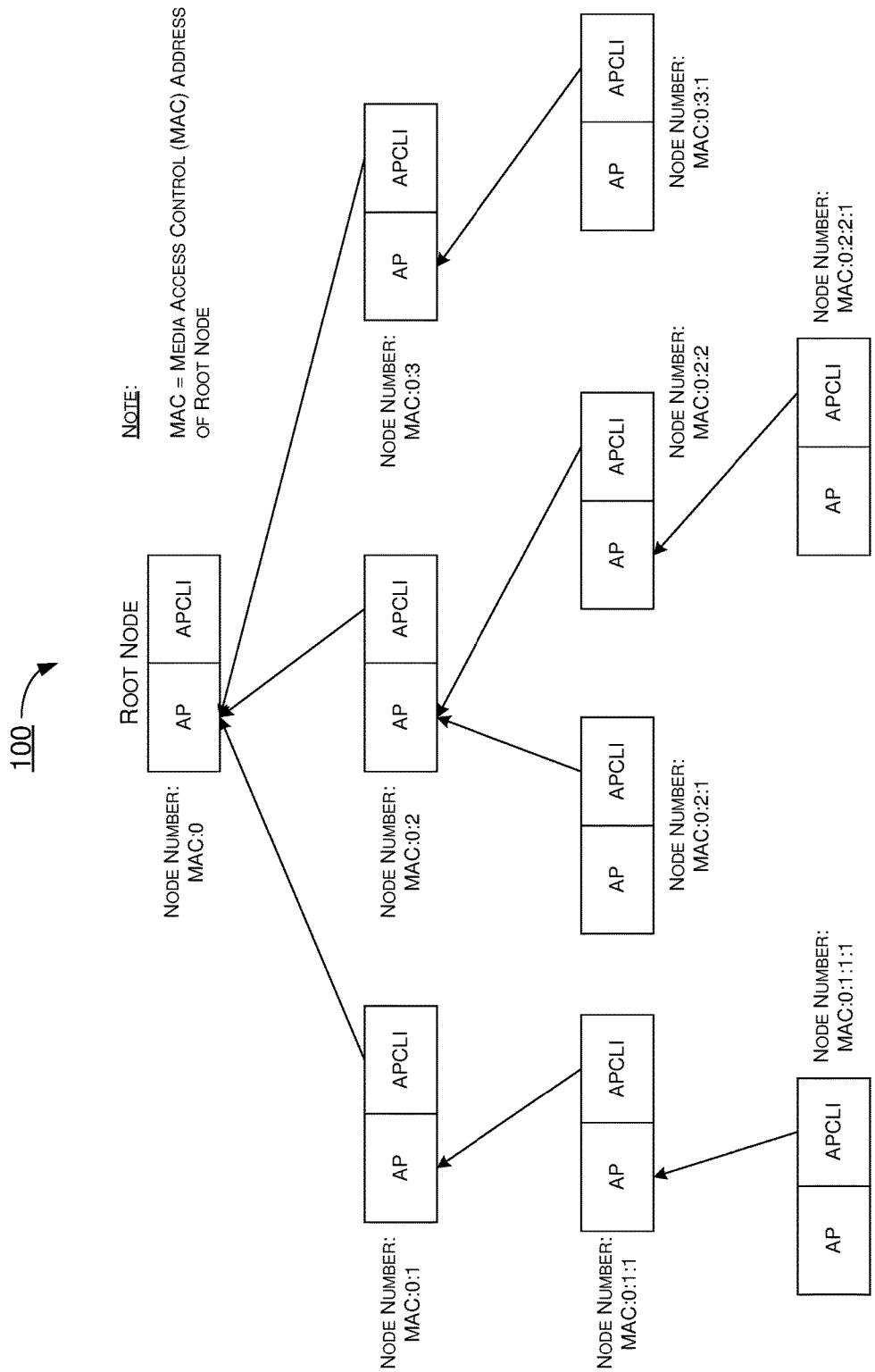
FIG. 1 is a diagram of an example tree structure under the propose scheme in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

In various implementations in accordance with the present disclosure, when a number of repeaters connect to each other, one or more tree structures may be created with one of the repeaters being a root node of a given tree structure. In a tree structure, each parent node may have one or more child nodes. The root node of each tree structure may be assigned a unique number. When a repeater connects to a node of a tree structure, that repeater may be assigned a node number in such a way that the repeater knows its position in the tree structure with respect to the respective root node, as well as a number of hops to the root node. Under the proposed scheme of the present disclosure, as each node is aware of its position in the tree structure, it can be determined whether a parent node would become a child node of its own child node if a connection between the two is to be established.

Under the proposed scheme of the present disclosure, each root node in a tree structure may be assigned a node number which is unique. For instance, each node as a parent node may assign the node number for each of its child node(s). The node numbers are unique due to the uniqueness of the media access control (MAC) address of the root node in a given tree structure and among all tree structures, since every communication device has its own MAC address that is different from the MAC addresses of other communication devices. For example, a root node, having the node number of MAC:0 (e.g., 11:22:33:44:55:66:0), may assign a node number to its first child node as MAC:0:1 and a node number to its second child node as MAC:0:2. Similarly, the node with the node number of MAC:0:1 may assign a node number to its first child node as MAC:0:1:1 and so on. That is, the root node may adopt the node number of MAC:0, where MAC denotes the MAC address of the root node. Next, when a first child node connects to the root node, the first child node may be assigned a node number of MAC:0:1 by the root node. This means that the first child node is directly connected to the root node and is a part of the first branch. Then, when a second child node connects to the root node, the second child node may be assigned a node number of MAC:0:2 by the root node. This means that the second child node is directly connected to the root node and is a part of the second branch. Subsequently, when a node connects to the first child node, that node may be assigned a node number of MAC:0:1:1 by the first child node. This means this node is a part of the first branch, with its parent node having the node number of MAC:0:1.

FIG. 1 illustrates an example tree structure 100 in accordance with an implementation of the present disclosure. Referring to FIG. 1, each repeater as a node of tree structure 100 may function as a host, access point or repeater_AP (labeled as "AP" in FIG. 1) and/or a client, station or repeater_STA (labeled as "APCLI" in FIG. 1). Specifically, a parent node functions as repeater_AP when connected to one or more child nodes, and a child node functions as repeater_STA when connected to its parent node.

In tree structure 100, the root node is assigned the node number of MAC:0, and has three child nodes assigned the node numbers of MAC:0:1, MAC:0:2 and MAC:0:3, respectively. The first child node of the root node, having the node number of MAC:0:1, has a child node connected to it with the node number of MAC:0:1:1. That child node, having the node number of MAC:0:1:1, in turn has a child node connected to it with the node number of MAC:0:1:1:1. The second child node of the root node, having the node number of MAC:0:2, has two child nodes connected to it with the node numbers of MAC:0:2:1 and MAC:0:2:2, respectively. One of the two child nodes, having the node number of MAC:0:2:2, has a child node connected to it with the node number of MAC:0:2:2:1. The third child node of the root node, having the node number of MAC:0:3, has a child node connected to it with the node number of MAC:0:3:1.

As can be seen in tree structure 100, it can be determined that a given node ("node 1") is a child node of another node ("node 2") when the node number of node 2 is present in the node number of node 1. For example, in tree structure 100, the node having the node number of MAC:0:2:2 is a child node of the node having the node number of MAC:0:2, which is the child node of the node having the node number of MAC:0 (i.e., the root node). As another example, it can be determined that the node having the node number of MAC:0:1:1 is a child node of (or, in a branch extending from) the node having the node number of MAC:0:1 and the node having the node number of MAC:0 since both of the node numbers MAC:0:1 and MAC:0 are present in the node number of MAC:0:1:1.

Under the proposed scheme of the present disclosure, there may be a number of ways in which node number information is passed on from a parent node to a child node. In cases of a new connection when a child node connects to its parent node, the parent node may provide node number information during the association response stage. For example, the node number information (e.g., the node number of the parent node) may be included in a proprietary information element (IE).

In cases of a parent node connecting to a new root node, the parent node may send a unicast action frame to each of its child node(s) with the child node's new node number. Upon receiving this action frame, each child node may update its own node number and, in turn, send an action frame with a new node number for each of its own child node(s) to each of its child node(s).

In cases in which a node is disconnected and becomes a root node itself, such node may use its MAC address as its new node number and send an action frame with a new node number for each of its own child node(s) to each of its child node(s), e.g., by unicast. Since the MAC address of every networking device (including repeaters) is unique, the node number which a root node assigns to itself using its MAC address (e.g., when it is disconnected from its parent node) will be unique. Based on this unique node number of the root node, all the subsequent node numbers in the respective tree structure will be re-generated and hence unique.

In some implementations, the node number of a node (e.g., root node) may be included in its beacons and probe responses.

Under the proposed scheme of the present disclosure, when a node is disconnected from its parent node, the node may take one or more actions as described below. Upon disconnection, the node becomes a new node and thus may assign itself and its child node(s) new node numbers by using its own MAC address. In some implementations, the node may wait for a random duration before starting to search for a node functioning as repeater_AP to connect. The reasons for waiting for a random during before searching for connection is to avoid simultaneous connections from occurring. For instance, if a root node is switched off and thus results in its child nodes being disconnected, its child nodes should not attempt new connections simultaneously.

In some implementations, the node may check the node number in the beacons and probe responses. In some implementations, the node may refrain from initiating connection with node(s) functioning as repeater_AP which is/are its child node(s) to avoid formation of a loop; otherwise, the node may connect to any other node not its child node. In some implementations, while connection is ongoing, no connection on any other interface of the node may be accepted. This is to avoid simultaneous connections and inconsistency in the node numbering in accordance with the proposed scheme of the present disclosure. Once the node is connected to another node, the node may assign and pass on the new node number for each child node to its child node(s).

Under the proposed scheme of the present disclosure, to avoid simultaneous connections, while connection process on one interface is ongoing connection on other interfaces of a node need to be rejected. In some implementations, in case that connection on an AP interface (i.e., an interface functioning as repeater_AP on a node) is ongoing, connection on an APCLI interface (i.e., an interface functioning as repeater_STA on the node) will not be initiated. Moreover, connection requests on other AP interfaces of the node will be rejected. For instance, an authentication response may be sent with a status code=30, indicating the request for connection is refused temporarily.

Under the proposed scheme of the present disclosure, one or more actions may be taken with respect to loop detection in cases of simultaneous connections. Although randomness (e.g., waiting for a random duration) as described above may be utilized to avoid simultaneous connections, loop formation is still possible. In some implementations, when a connection is made, the root node may update the node number to its child node(s), with the initial portion of the node number given to the child node(s) being the MAC address of the root node. In an event of a loop formation, when an action frame received by a node whose initial portion of the node number is the MAC address of the same node, the node receiving the action frame may detect or otherwise determine that a loop has been formed. For example, if a node has a MAC address of MAC1 and receives a node number of MAC1:0:1:1, then such node may detect that there is a loop formed. In some implementations, when detecting a loop, a node may issue a request for disconnection for its last connection.

As defined in the Institute of Electrical and Electronics Engineers (IEEE) 802.11 specification, an action frame is a generic frame used in the protocol to pass on information from one device to another. In the context of the present disclosure, an action frame may be sent by a parent node to its child node(s) when the parent node assigns its child node(s) new node number(s) without disconnecting them. For example, if the parent node is disconnected from its root node, the parent node may assign itself a new node number using its own MAC address, and may send an action frame to its child node(s) to inform or otherwise assign the child node(s) of its/their new node number(s) based on the new root node number with which the parent node has assigned itself. Alternatively, when the original root node connects to another repeater to become a child node of that node, the original root node (now a child node itself) may be assigned a new node number from its parent node and may assign new node number(s) to its own child node(s). The original root node, not a child node itself, may use action frames to assign the new node number(s) to its child node(s). The child node(s) may in turn assign new node number(s) to its/their child node(s) through action frames.

With respect to loop avoidance in networks, the proposed scheme employs a weight system. In various implementations in accordance with the present disclosure, all communication devices (e.g., repeaters) in a given network may have the same weight. This means the communication devices, having the same weight and in the same network, are connected to one another through some link. The weight is a unique identifier for the communication devices in the same network. In cases of single-band connections, a client, station or repeater_STA (herein interchangeably referred as "APCLI") may refrain from connecting to any host, access point or repeater_AP (herein interchangeably referred as "AP") having the same weight as its own. In cases of dual-band connections, an APCLI of one band in a communication device may refrain from connecting to an AP with the same weight unless the APCLI of the other band in the communication device is also connected to the same AP. For example, the 2.4 GHz APCLI of a communication device may be connected to AP1 with weight W1. In this example, the 5 GHz APCLI of that communication device may attempt to connect to any AP with weight other than W1. Alternatively, the 5 GHz APCLI of that communication device may attempt to connect to AP1, since the 2.4 GHz APCLI of that communication device is connected to AP1.

Under the proposed scheme, a loop due to simultaneous connections may be detected. In cases in which a loop may be formed due to simultaneous connections, a communication device may receive its own weight from another communication device through an action frame. As this means there is a loop, the communication device may disconnect the connection or link from which such action frame is received.

Figure 3:
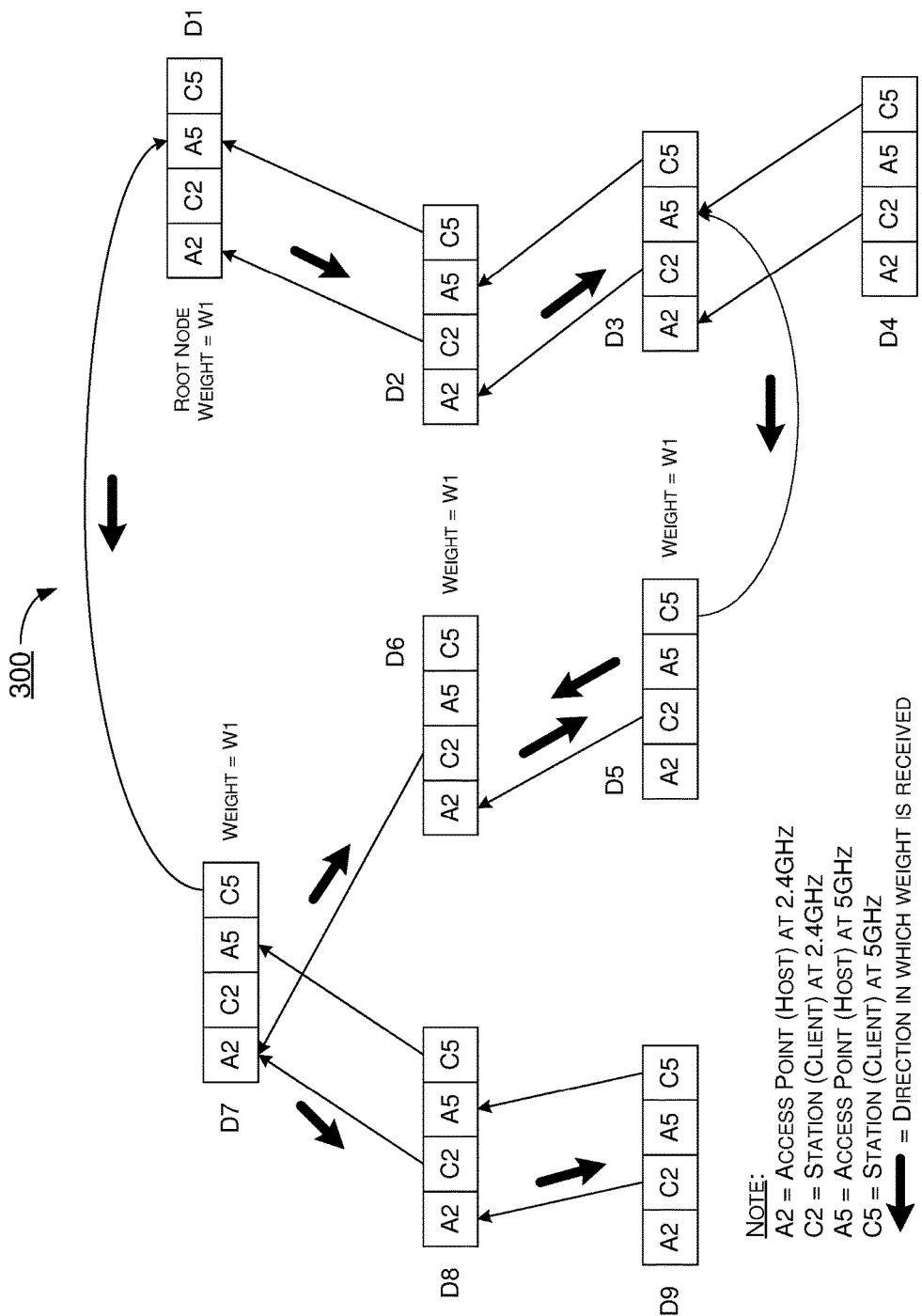
FIG. 3 is a diagram of an example scenario in accordance with an implementation of the present disclosure.

FIG. 3 illustrates an example scenario 300 in accordance with an implementation of the present disclosure. Referring to FIG. 3, a loop is formed with simultaneous connections, including the connection between communication device D7 and communication device D1 and the connection between communication device D5 and communication device D3. In the example shown in FIG. 3, communication device D5 may receive its own weight (W1) from communication device D3 through an action frame. Under the proposed scheme, communication device D5 may disconnect the connection or link from which such action is received. In scenario 300, accordingly, communication device D5 may disconnect its connection or link with communication device D3. Similarly, communication device D7 may receive its own weight (W1) from communication device D1 through an action frame. Under the proposed scheme, communication device D7 may disconnect the connection or link from which such action is received. In scenario 300, accordingly, communication device D7 may disconnect its connection or link with communication device D1.

Under the proposed scheme, the link from which a weigh of a communication device is received is referred as the "weight defining link". In cases of link failover in which the weight defining link of a communication device breaks, the communication device may take a number of actions under the proposed scheme for loop avoidance. For instance, the communication device may allocate, adopt or otherwise assign itself a new weight and a new node number. The communication device may then transfer or otherwise assign the new weight and new node number to its child node(s) that is/are connected to it. For example, the new weight and new node number may be included in a proprietary information element (IE) in an association response or an action frame. The communication device may also wait for information transfer (e.g., all its child nodes having adopted the new weight and respective new node numbers) to happen before attempting new connection. The communication device may attempt connection to other communication devices with different weights. In cases of link failover in which a link other than the weight defining link of a communication device breaks, the communication device may attempt connection to communication devices with different weights.

The proposed scheme also provides a solution for loop avoidance in cases of roaming. When a communication device roams to within a connection range of a target AP, a loop might result if the weight of the target AP is the same as the weight of the communication device. Under the proposed scheme, the communication device may break any existing link (i.e., indirect link(s)) with the target AP before directly connecting to the target AP. Therefore, it is imperative that the path between the communication device and the target AP be known.

In various implementations in accordance with the present disclosure, each communication device in a network may be assigned a unique node number. The node number of a given communication device may be assigned by the link assigning the communication device its weight. That is, the weight defining link of a communication device may also assign the node number to the communication device. The node number may be such that the communication device knows its position in a network with respect to the root node of the network, as well as a number of hops to the root node (e.g., the node whose weight is passed on to all other communication devices of the network).

Figure 2:
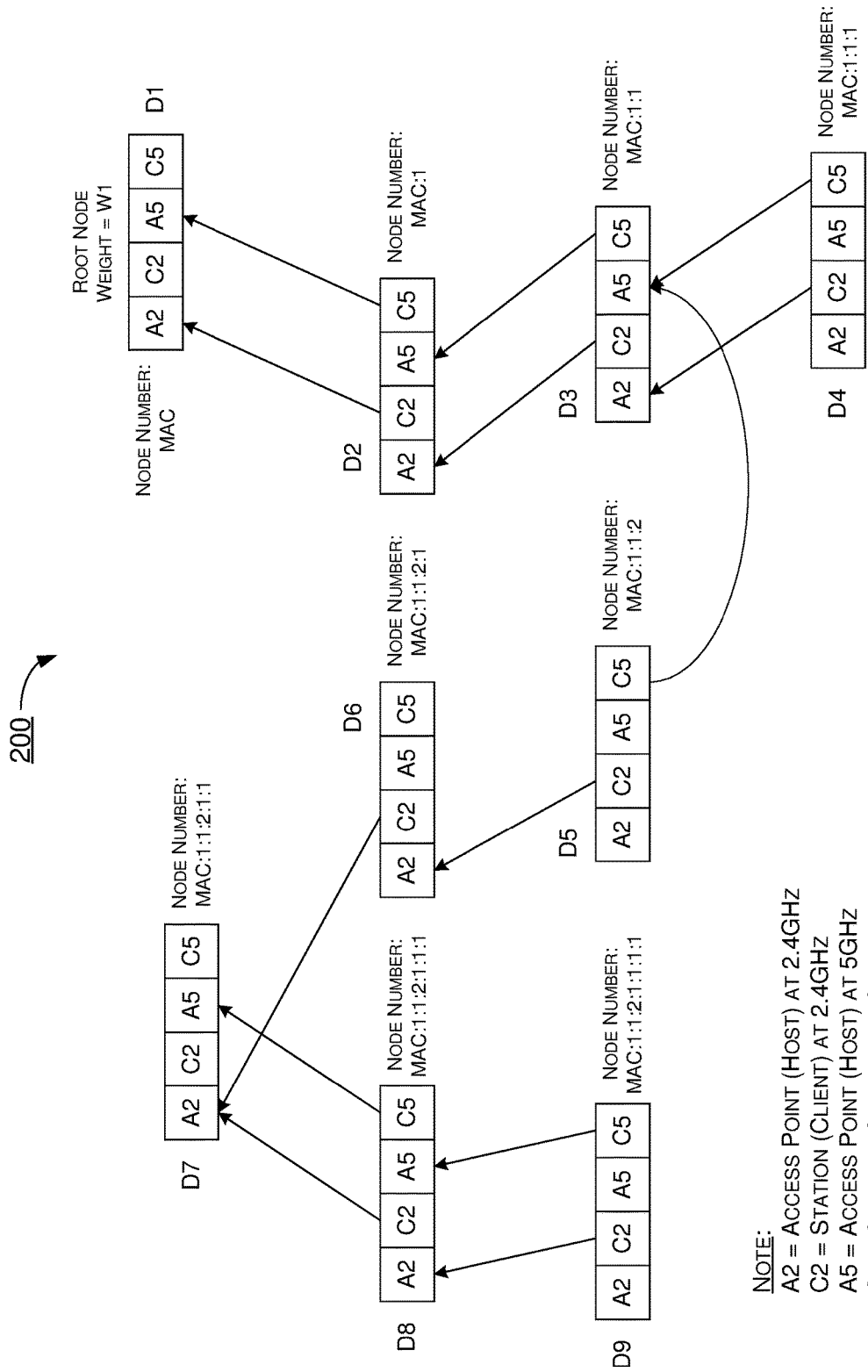
FIG. 2 is a diagram of an example scenario in accordance with an implementation of the present disclosure.

FIG. 2 illustrates an example scenario 200 in accordance with an implementation of the present disclosure. Referring to FIG. 2, each repeater as a node in the network is a dual-band communication device operating at 2.4 GHz and 5 GHz. That is, each communication device in the network in FIG. 2 can operate as an access point (or host), denoted as "A2", and as a station (or client), denoted as "C2" at 2.4 GHz. Each communication device in the network in FIG. 2 can also operate as an access point (or host), denoted as "A5", and as a station (or client), denoted as "C5", at 5 GHz. In the example network shown in FIG. 2, there are nine communication devices, labeled as D1-D9. In this example, communication device D1 is the root node with "MAC" (i.e., the MAC address thereof) as its node number and "W1" as its weight. Accordingly, the respective node number of each communication device in the network includes "MAC", and the weight of each communication device in the network is "W1".

Accordingly, under the proposed scheme, every communication device in a dual-band network may be aware of its position in a network with respect to the root node of the dual-band network, as well as a number of hops to the root node. Moreover, under the proposed scheme, every communication device in a network may be aware of the path to any other communication device in the network. For example, in scenario 200, communication device D9 knows that a link or path through which to reach communication device D4 is communication device D8, since "MAC:1:1" is common to the node numbers of communication devices D4, D8 and D9. Therefore, in order for communication device D9 to connect to communication device D4 directly without forming a loop, communication device D9 needs to break its connection or link with communication device D8.

Under the proposed scheme, a roaming communication device may make decisions with respect to a target AP depending on whether the communication device received its node number from or through the target AP, whether the target AP received its node number from or through the communication device, or whether the communication device is a sibling of the target AP. In cases in which the target AP received its node number from or through the communication device, the communication device may break any link that may have been established with the target AP. Moreover, the communication device may refrain from attempting to connect to the target AP as long as the weight of the target AP is the same as the weight of the communication device. The communication device may attempt connection when the weight of the target AP is different from the weight of the communication device. In cases in which the communication device received its node number from or through the target AP, the communication device may break any link that may have been established with the target AP. Moreover, the communication device may become a root node itself and assign itself (and any child node(s)) a new node number and a new weight. Subsequently, the communication device may establish a connection or link with the target AP. Additionally, the communication device may request its child node(s) to avoid any connection unless the roaming is complete. Furthermore, the communication device may allow connection(s) on the APCLI interface(s) while prohibiting connection(s) on the AP interface(s).

Illustrative Implementations

Figure 4:
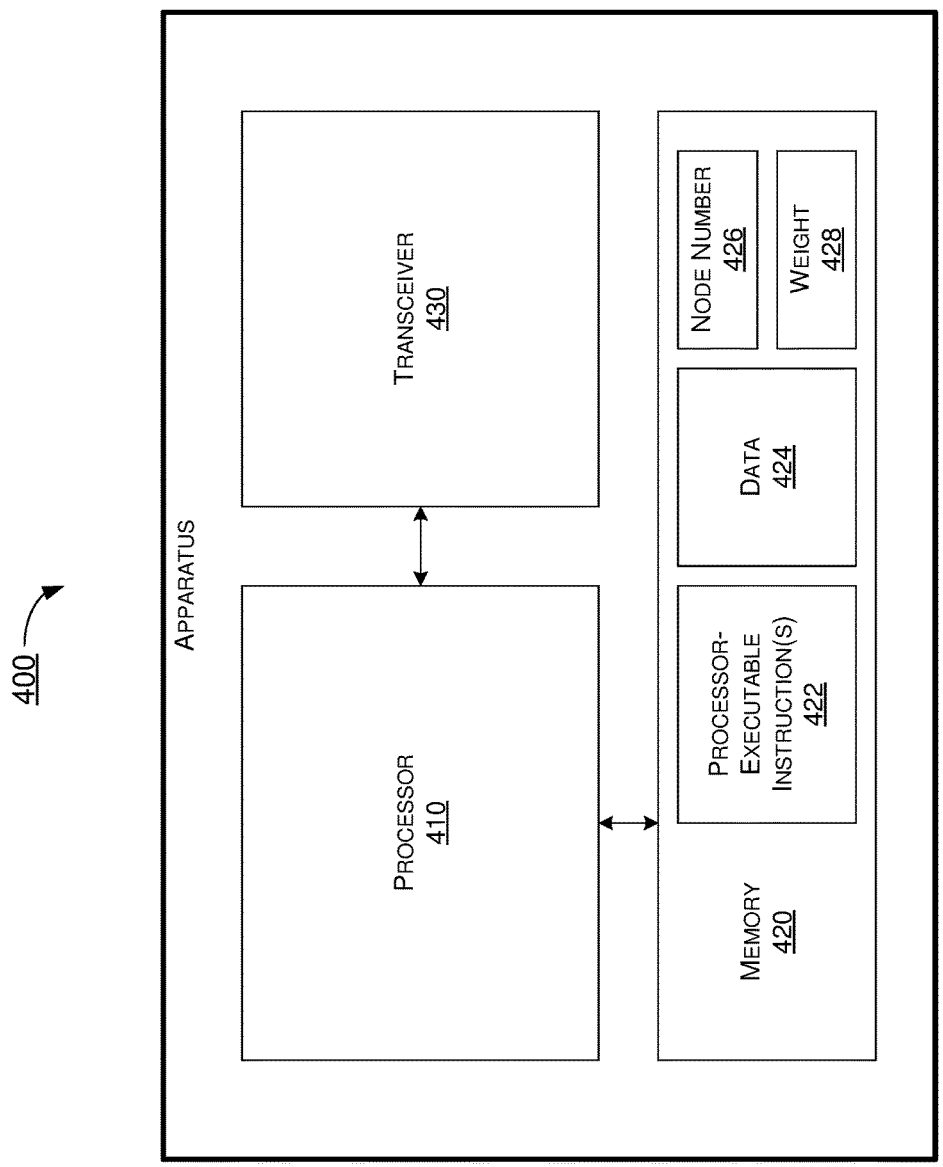
FIG. 4 is a simplified block diagram of an example apparatus in accordance with an implementation of the present disclosure.

FIG. 4 illustrates an example apparatus 400 in accordance with an implementation of the present disclosure. Apparatus 400 may perform various functions to implement schemes, techniques, processes and methods described herein pertaining to loop avoidance in repeater networks, including tree structure 100, scenario 200 and scenario 300 described above as well as process 500 and process 600 described below. Apparatus 400 may be a part of an electronic apparatus which may be a communication device, a computing apparatus, a portable or mobile apparatus, or a wearable apparatus. For instance, apparatus 400 may be implemented in a repeater, a Wi-Fi access point, a smartphone, a smartwatch, a smart bracelet, a smart necklace, a personal digital assistant, or a computing device such as a tablet computer, a laptop computer, a notebook computer, a desktop computer, or a server. Alternatively, apparatus 400 may be implemented in the form of one or more integrated-circuit (IC) chips such as, for example and not limited to, one or more single-core processors, one or more multi-core processors, or one or more complex-instruction-set-computing (CISC) processors. Apparatus 400 may include at least those components shown in FIG. 4, such as a processor 410 and a memory 420. Additionally, apparatus 400 may include a transceiver 430 configured to transmit and receive data wirelessly (e.g., in compliance with the IEEE 802.11 specification and/or any applicable wireless protocols and standards).

Memory 420 may be a storage device configured to store one or more sets of codes, programs and/or instructions 422 as well as data 424 therein. For example, memory 420 may be operatively coupled to processor 410 to receive data 424, a respective node number 426 and/or a respective weight 428 (e.g., a first weight) to store therein. When apparatus 400 is implemented in or as a first communication device such as a first repeater, memory 420 may store a respective first node number of the first communication device. Memory 420 may be implemented by any suitable technology and may include volatile memory and/or non-volatile memory. For example, memory 420 may include a type of random access memory (RAM) such as dynamic RAM (DRAM), static RAM (SRAM), thyristor RAM (T-RAM) and/or zero-capacitor RAM (Z-RAM). Alternatively or additionally, memory 420 may include a type of read-only memory (ROM) such as mask ROM, programmable ROM (PROM), erasable programmable ROM (EPROM) and/or electrically erasable programmable ROM (EEPROM). Alternatively or additionally, memory 420 may include a type of non-volatile random-access memory (NVRAM) such as flash memory, solid-state memory, ferroelectric RAM (FeRAM), magnetoresistive RAM (MRAM) and/or phase-change memory.

Processor 410 may be implemented in the form of one or more single-core processors, one or more multi-core processors, or one or more CISC processors. That is, processor 410 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure.

Processor 410 may access memory 420 to execute the one or more instructions stored in memory 420. Upon executing the one or more sets of instructions, processor 410 may be configured to perform operations pertaining to loop avoidance in repeater networks in accordance with the present disclosure. For instance, processor 410 may, via transceiver 430, establish a connection with a second communication device (e.g., a second repeater) of a plurality of communication devices (e.g., multiple repeaters), with the second communication device being a child node of the first communication device. Processor 410 may also assigning a second node number and/or the first weight to the second communication device. At least a portion of the second node number of the second communication device may include the first node number of the first communication device. At least a portion of the first node number may include a root node number that is an identification (e.g., MAC address) unique to one of the plurality of communication devices as a root node in a tree structure formed by at least some of the plurality of communication devices including the first and the second communication devices.

As an example and without limitation, when apparatus 400 is implemented as the node having the node number MAC:0:2 in FIG. 1, the second communication device may be the node having the node number MAC:0:2:1. In this example, at least a portion of the second node number of the second communication device (MAC:0:2:1 in this example) includes the first node number of the first communication device (MAC:0:2 in this example). Moreover, at least a portion of the first node number of the first communication device (MAC:0:2 in this example) includes the root node number of the root node (MAC:0 in this example). Apparatus 400 may, based on its node number, determine its position relative to the root node in the tree structure, as well as the number of hops to the root node. In the present example, apparatus 400 can determine that it is two hops away from the root node. This is because the node whose node number is "MAC:0" is one hop away from the root node and apparatus 400 is the child node of that node. Apparatus 400 can also determine that it is in a first branch of the tree structure. This is because the node number of the parent node of apparatus 400 is "MAC:0" and "0" is the number used for the first child node of the root node, "1" is the number used for the second child node of the root node, "2" is the number used for the third child node of the root node, and so on.

In some implementations, in assigning the second node number and/or the first weight to the second communication device, processor 410 may be configured to perform a number of operations. For instance, processor 410 may, via transceiver 430, disconnect from a third communication device of the plurality of communication devices, with the third communication device being an original root node and the first communication device being an original child node of the original root node. Processor 410 may also, via transceiver 430, connect to a fourth communication device of the plurality of communication devices, with the fourth communication device being a new root node and the first communication device being a new child node of the new root node. The fourth communication device may have a second weight different from the first weight. Processor 410 may adopt a new first node number and/or the second weight for the first communication device. Processor 410 may further assign a new second node number and/or the second weight to the second communication device, which is a child node of the first communication device, by unicasting an action frame to the second communication device via transceiver 430. At least a portion of the new second node number of the second communication device may include the new first node number of the first communication device. At least a portion of the new first node number may include a node number of the fourth communication device that is unique to the fourth communication device.

In some other implementations, upon executing the one or more sets of instructions, processor 410 may be further configured to perform additional operations. For instance, processor 410 may disconnect, via transceiver 430, from the third communication device of the plurality of communication devices, with the first communication device being a child node of the third communication device. Processor 410 may assign the first node number and/or a third weight (which is different from the first weight) to the first communication device, with the first communication device being a root node. At least a portion of the second node number of the second communication device may include the first node number of the first communication device. The first node number may include an identification unique to the first communication device as the root node.

Additionally, upon executing the one or more sets of instructions, processor 410 may be further configured to perform a number of operations. For instance, upon disconnecting from a device from which processor 410 received its node number and weight, processor 410 may assign itself a new node number and weight, and may pass the new node numbers and weight to its connected devices. This may be done before attempting connection to any other device. Moreover, upon passage of a random length of time after disconnecting from the third communication device, processor 410 may, via transceiver 430, search for a communication devices among the plurality of communication devices with which to establish a connection. Processor 410 may also, via transceiver 430, connect to a fourth communication device of the plurality of communication devices, which is not a child node of the first communication device, with the first communication device being a child node of the fourth communication device. The fourth communication device may have a second weight different from the third weight.

In some implementations, in connecting to the fourth communication device, processor 410 may reject connection with another communication device of the plurality of the communication devices while a connection with the fourth communication device is being established.

In some implementations, in searching for the communication devices among the plurality of communication devices that is functioning as an access point, processor 410 may perform a number of operations. For instance, processor 410 may, via transceiver 430, receive one or more beacons and/or one or more probe responses from one or more of the plurality of communication devices. Processor 410 may determine whether a respective node number and/or a respective weight indicated in each of the one or more beacons and/or each of the one or more of the more probe responses is the same as a respective node number and/or is the same as a respective weight of a child node or a parent node of the first communication device. Processor 410 may identify the fourth communication device by excluding one or more other communication devices, with each of the one or more other communication devices being a child node of the first communication device and functioning as an access point. In some implementations, processor 410 may check the weight of each communication device in each of the one or more beacons and/or each of the one or more of the more probe responses, and may exclude those communication devices having the same weight.

In some implementations, upon executing the one or more sets of instructions, processor 410 may be further configured to perform additional operations. For instance, processor 410 may adopt a new first node number and/or the second weight for the first communication device. Processor 410 may also assign a new second node number and/or the second weight to the second communication device by unicasting an action frame to the second communication device via transceiver 430. At least a portion of the new second node number of the second communication device may include the new first node number of the first communication device. At least a portion of the new first node number may include a node number of the fourth communication device that is unique to the fourth communication device.

Additionally, processor 410 may determine a node number of the fourth communication device. Processor 410 may also disconnect, via transceiver 430, from the fourth communication device in an event that at least a portion of the node number of the fourth communication device includes the first node number of the first communication device.

Figure 5:
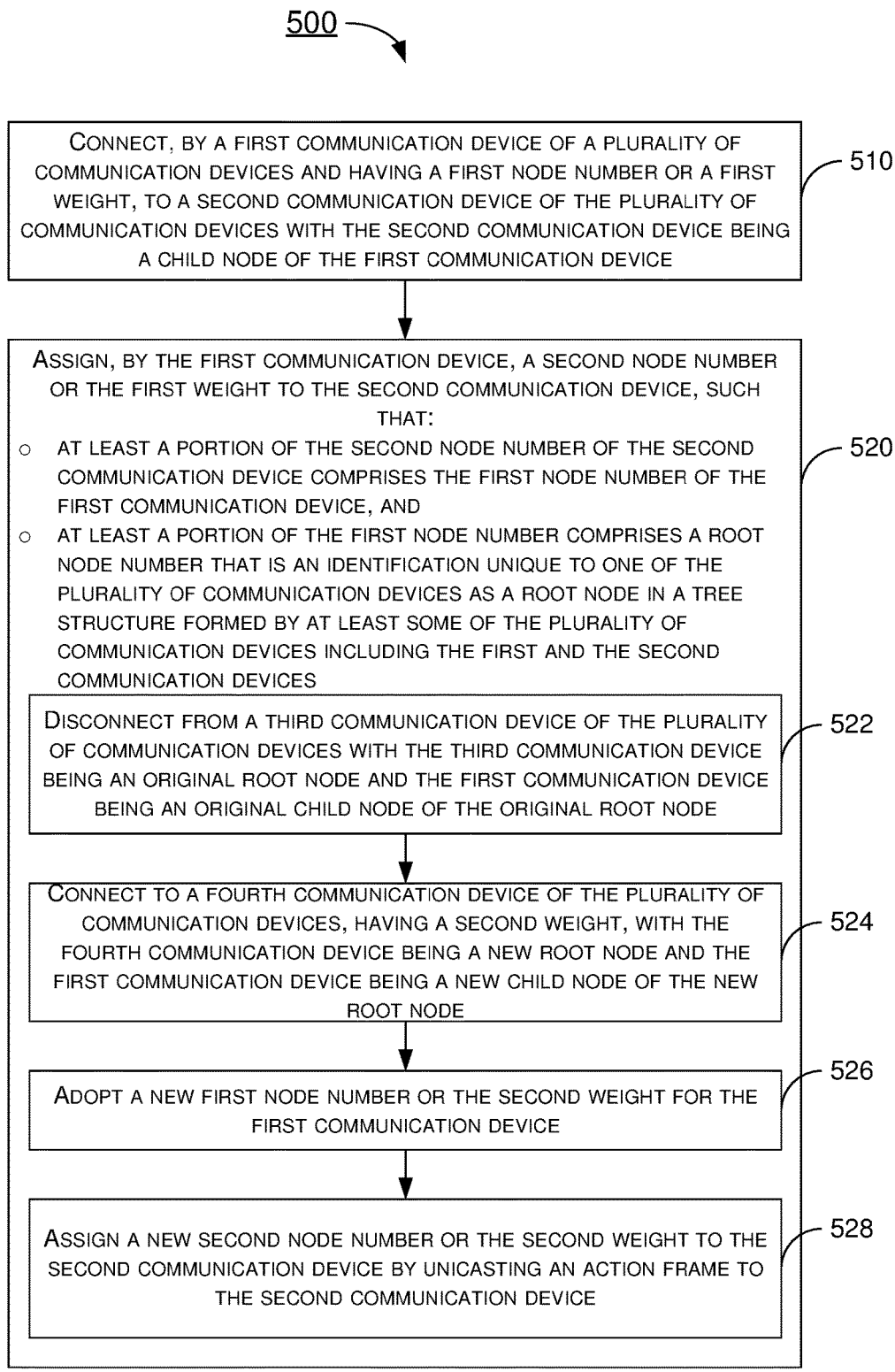
FIG. 5 is a flowchart of an example process in accordance with an implementation of the present disclosure.

FIG. 5 illustrates an example process 500 in accordance with an implementation of the present disclosure. Process 500 may represent an aspect of implementing features of apparatus 400. Process 500 may include one or more operations, actions, or functions as illustrated by one or more of blocks 510 and 520, as well as sub-blocks 522, 524, 526 and 528. Although illustrated as discrete blocks, various blocks of process 500 may be divided into additional blocks, combined into fewer blocks, or eliminated, depending on the desired implementation. Moreover, the blocks/sub-blocks of process 500 may executed in the order shown in FIG. 5 or, alternatively in a different order. Process 500 may be implemented by apparatus 400 and any variations thereof. For instance, process 500 may be implemented in and by each of the communication devices, nodes or repeaters shown in FIG. 1, FIG. 2 and FIG. 3. Solely for illustrative purposes, process 500 is described below in the context of apparatus 400 being a first communication device (e.g., first repeater) of a plurality of communication devices (e.g., multiple repeaters) and having a first node number and/or a first weight. Process 500 may begin at block 510.

At 510, process 500 may involve processor 410 of apparatus 400 connecting, via transceiver 430, to a second communication device of the plurality of communication devices, with the second communication device being a child node of the first communication device. Process 500 may proceed from 510 to 520.

At 520, process 500 may involve processor 410 of apparatus 400 assigning a second node number and/or the first weight to the second communication device such that: (1) at least a portion of the second node number of the second communication device includes the first node number of the first communication device, and (2) at least a portion of the first node number includes a root node number that is an identification unique to one of the plurality of communication devices as a root node in a tree structure formed by at least some of the plurality of communication devices including the first and the second communication devices.

Alternatively or additionally, in assigning the second node number and/or a first weight to the second communication device, process 500 may involve processor 410 performing a number of operations, such as those shown in sub-blocks 522, 524, 526 and 528. At 522, process 500 may involve processor 410 disconnecting, via transceiver 430, from a third communication device of the plurality of communication devices, with the third communication device being an original root node and the first communication device being an original child node of the original root node. Process 500 may proceed from 522 to 524. At 524, process 500 may involve processor 410 connecting, via transceiver 430, to a fourth communication device of the plurality of communication devices, with the fourth communication device being a new root node and the first communication device being a new child node of the new root node. The fourth communication device may have a second weight different from the first weight. Process 500 may proceed from 524 to 526. At 526, process 500 may involve processor 410 adopting a new first node number and/or a second weight for the first communication device. Process 500 may proceed from 526 to 528. At 528, process 500 may further involve processor 410 assigning a new second node number and/or a second weight to the second communication device by unicasting an action frame to the second communication device via transceiver 430. At least a portion of the new second node number of the second communication device may include the new first node number of the first communication device. At least a portion of the new first node number may include a node number of the fourth communication device that is unique to the fourth communication device. In some implementations, the node number of the fourth communication device may include the MAC address of the fourth communication device.

It is noteworthy that it is not necessary for the first communication device to connect to the fourth communication device in order for the first communication device to adopt, allocate or otherwise assign itself a new node number and/or a new weight. That is, prior to connecting to the fourth communication device, process 500 may involve processor 410 adopting, allocating or otherwise assigning a new node number and/or a new weight to apparatus 400, which is implemented as the first communication device. Thus, the first communication device may at least temporarily have a new node number and/or a new weight during the interim between disconnecting from the third communication device and connecting to the fourth communication device.

In some implementations, the root node number may include the MAC address of the one of the plurality of communication devices as the root node of the tree structure.

In some implementations, each of the plurality of communication devices may include a repeater.

In some implementations, in assigning the second node number and/or a first weight to the second communication device, process 500 may involve processor 410 providing the second node number and/or a first weight to the second communication device in an association response or an action frame. In some implementations, the second node number may be included in an information element (IE).

In some implementations, process 500 may also involve processor 410 determining a position of apparatus 400, implemented as the first communication device, relative to the root node in the tree structure and a number of hops to the root node based on the first node number of the first communication device.

In some implementations, process 500 may further involve process 410 of apparatus receiving, from the second communication device, an action frame that assigns a new weight or a new node number to apparatus 400.

Figure 6:
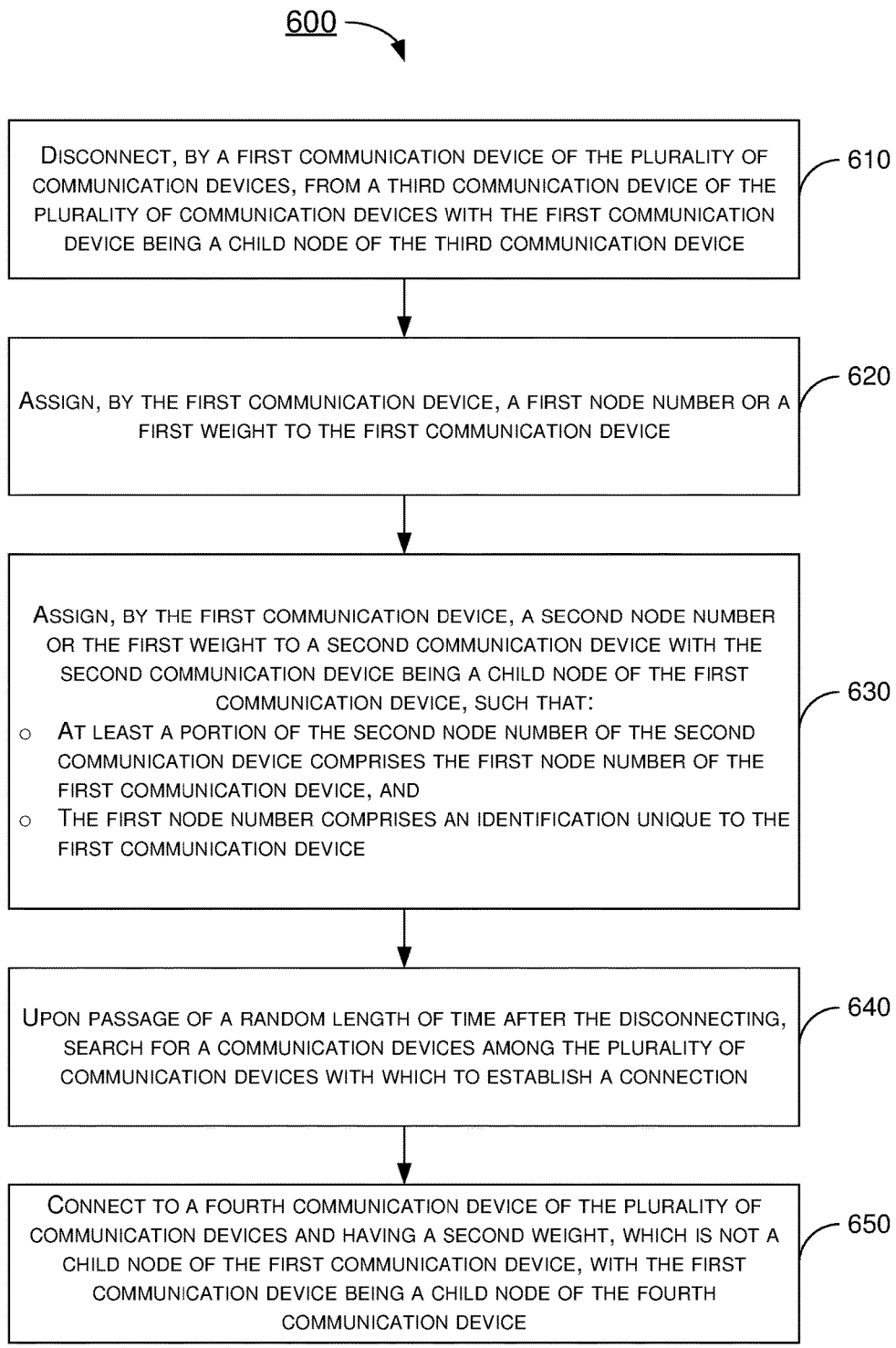
FIG. 6 is a flowchart of an example process in accordance with another implementation of the present disclosure.
Figure 7:
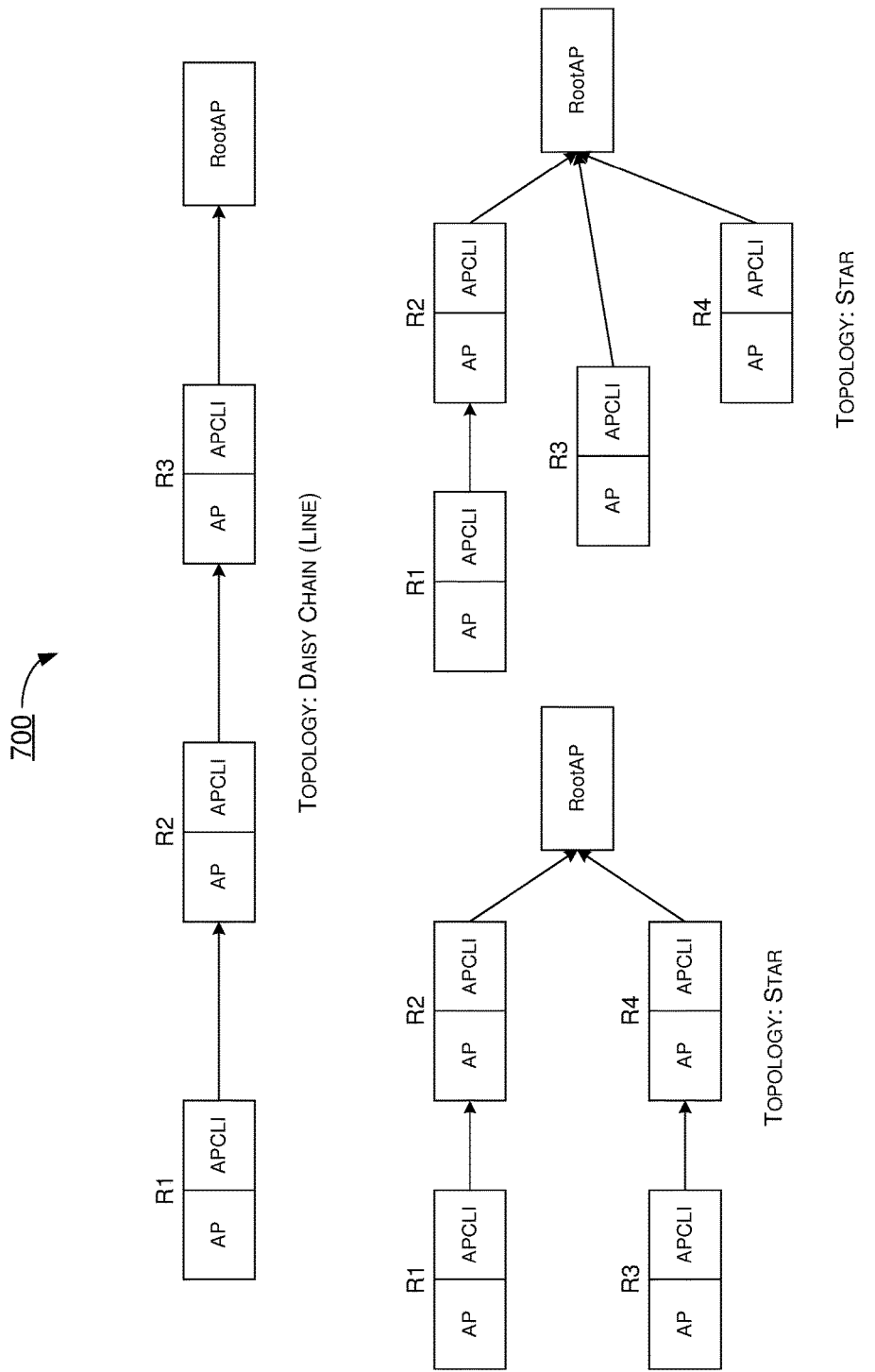
FIG. 7 is a diagram of an example scenario of network topologies.
Figure 8:
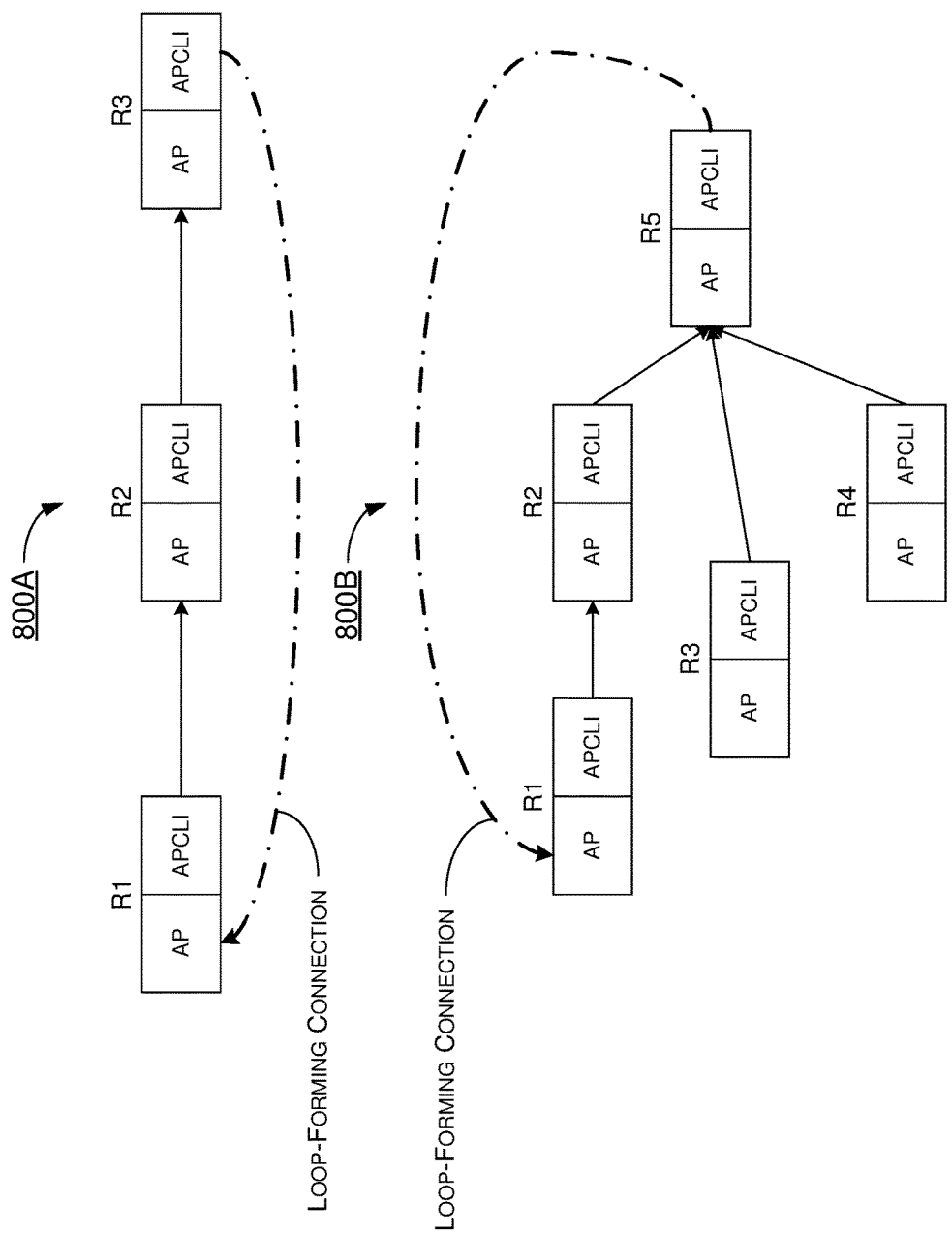
FIG. 8 is a diagram of example scenarios of loop formation.
Figure 9:
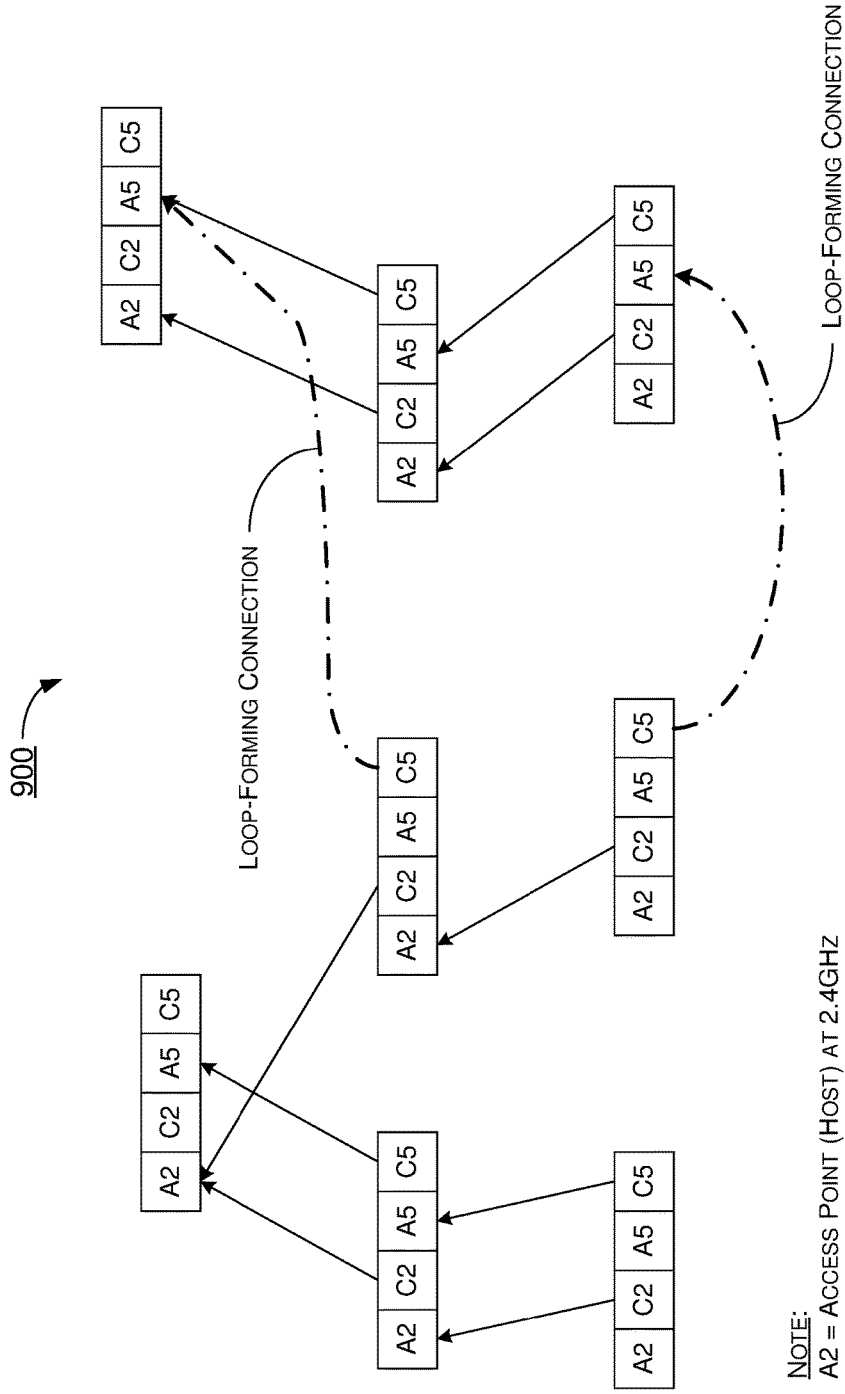
FIG. 9 is a diagram of an example scenario of loop formation in a dual-band network of repeaters.

FIG. 6 illustrates an example process 600 in accordance with an implementation of the present disclosure. Process 600 may represent an aspect of implementing features of apparatus 400. Process 600 may include one or more operations, actions, or functions as illustrated by one or more of blocks 610, 620, 630, 640 and 650. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Process 600 may be implemented by apparatus 400 and any variations thereof. For instance, process 600 may be implemented in and by each of the communication devices, nodes or repeaters shown in FIG. 1, FIG. 2 and FIG. 3. Solely for illustrative purposes, process 600 is described below in the context of apparatus 400 being a first communication device (e.g., first repeater) of a plurality of communication devices (e.g., multiple repeaters) and having a first node number. Process 600 may begin at block 610.

At 610, process 600 may involve processor 410 of apparatus 400 disconnecting, via transceiver 430, from a third communication device of the plurality of communication devices, with the first communication device being a child node of the third communication device. Process 600 may proceed from 610 to 620.

At 620, process 600 may involve processor 410 of apparatus 400 assigning a first node number and/or a first weight to the first communication device. Process 600 may proceed from 620 to 630.

At 630, process 600 may involve processor 410 of apparatus 400 assigning a second node number and/or the first weight to a second communication device, with the second communication device being a child node of the first communication device. At least a portion of the second node number of the second communication device may include the first node number of the first communication device. The first node number may include an identification unique to the first communication device.

In some implementations, the first node number may include the MAC address of the first communication device.

In some implementations, process 600 may involve processor 410 of apparatus 400 performing additional operations. For instance, upon passage of a random length of time after the disconnecting, process 600 may involve processor 410 searching, via transceiver 430, for a communication devices among the plurality of communication devices with which to establish a connection. Moreover, process 600 may involve processor 410 connecting, via transceiver 430, to a fourth communication device of the plurality of communication devices, which is not a child node of the first communication device, with the first communication device being a child node of the fourth communication device. The fourth communication device may have a second weight different from the first weight.

In some implementations, in searching for the communication devices among the plurality of communication devices that is functioning as an access point, process 600 may involve processor 410 of apparatus 400 performing a number of operations. For instance, process 600 may involve processor 410 receiving, via transceiver 430, one or more beacons or one or more probe responses from one or more of the plurality of communication devices. Processor 600 may also involve processor 410 determining whether a respective node number and/or a respective weight indicated in each of the one or more beacons or one or more of the more probe responses is the same as a respective node number and/or is the same as a respective weight of a child node or a parent node of the first communication device. Process 600 may further involve processor 410 identifying the fourth communication device by excluding one or more other communication devices, with at least one of the one or more other communication devices being a child node of the first communication device and functioning as an access point. In some cases, such as with dual-band communication devices in a dual-band network, when one of the communication links over one of the two frequency bands is disconnected for a dual-band communication device, the dual-band communication device may scan for an AP which is not already a part of the network.

In some implementations, in connecting to the fourth communication device, process 600 may involve processor 410 rejecting connection with another communication device of the plurality of the communication devices while a connection with the fourth communication device is being established.

In some implementations, process 600 may involve processor 410 of apparatus 400 performing additional operations. For instance, process 600 may involve processor 410 adopting a new first node number and/or the second weight for the first communication device. Moreover, process 600 may involve processor 410 assigning a new second node number and/or the second weight to the second communication device by unicasting an action frame to the second communication device via transceiver 430. At least a portion of the new second node number of the second communication device may include the new first node number of the first communication device. At least a portion of the new first node number may include a node number of the fourth communication device that is unique to the fourth communication device.

In some implementations, the node number of the fourth communication device may include the MAC address of the fourth communication device.

In some implementations, process 600 may involve processor 410 of apparatus 400 performing additional operations. For instance, process 600 may involve processor 410 determining a node number of the fourth communication device. Furthermore, process 600 may involve processor 410 disconnecting from the fourth communication device in an event that at least a portion of the node number of the fourth communication device may include the first node number of the first communication device or in an event that a weight of the fourth communication device is same as a weight of the first communication device. Moreover, as a loop detection scenario, process 600 may involve processor 410 of apparatus 400 disconnecting from the fourth communication device (or any other node) in an event that processor 410 receives, from the fourth communication node (or any other node), an action frame with new node number that contains the MAC address of apparatus 400.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method implementable in plurality of communication devices, comprising:
    connecting, by a first communication device of the plurality of communication devices and having a first node number or a first weight, to a second communication device of the plurality of communication devices with the second communication device being a child node of the first communication device; and
    assigning, by the first communication device, a second node number or the first weight to the second communication device,
    wherein at least a portion of the second node number of the second communication device comprises the first node number of the first communication device, and
    wherein at least a portion of the first node number comprises a root node number that is an identification unique to one of the plurality of communication devices as a root node in a tree structure formed by at least some of the plurality of communication devices including the first and the second communication devices.

2. The method of claim 1, wherein the root node number comprises a media access control (MAC) address of the one of the plurality of communication devices as the root node of the tree structure.

3. The method of claim 1, further comprising:
    determining a position of the first communication device relative to the root node in the tree structure and a number of hops to the root node based on the first node number of the first communication device.

4. The method of claim 1, wherein the assigning of the second node number or the first weight to the second communication device comprises providing the second node number or the first weight to the second communication device in an association response or an action frame, and wherein the second node number is included in an information element (IE).

5. The method of claim 1, further comprising:
    receiving, by the first communication device from the second communication device, an action frame that assigns a new weight or a new node number to the first communication device.

6. The method of claim 1, wherein the assigning of the second node number or the first weight to the second communication device comprises:
    disconnecting from a third communication device of the plurality of communication devices with the third communication device being an original root node and the first communication device being an original child node of the original root node;
    connecting to a fourth communication device of the plurality of communication devices with the fourth communication device being a new root node and the first communication device being a new child node of the new root node, the fourth communication device having a second weight different from the first weight;
    adopting a new first node number or the second weight for the first communication device; and
    assigning a new second node number or the second weight to the second communication device by unicasting an action frame to the second communication device,
    wherein at least a portion of the new second node number of the second communication device comprises the new first node number of the first communication device, and
    wherein at least a portion of the new first node number comprises a node number of the fourth communication device that is unique to the fourth communication device.

7. The method of claim 6, wherein the node number of the fourth communication device comprises a media access control (MAC) address of the fourth communication device.

8. A method implementable in plurality of communication devices, comprising:
    disconnecting, by a first communication device of the plurality of communication devices, from a third communication device of the plurality of communication devices with the first communication device being a child node of the third communication device;
    assigning, by the first communication device, a first node number or a first weight to the first communication device; and
    assigning, by the first communication device, a second node number or the first weight to a second communication device with the second communication device being a child node of the first communication device,
    wherein at least a portion of the second node number of the second communication device comprises the first node number of the first communication device, and
    wherein the first node number comprises an identification unique to the first communication device.

9. The method of claim 8, wherein the first node number comprises a media access control (MAC) address of the first communication device.

10. The method of claim 8, further comprising:
    upon passage of a random length of time after the disconnecting, searching for a communication devices among the plurality of communication devices with which to establish a connection; and
    connecting to a fourth communication device of the plurality of communication devices, which is not a child node of the first communication device, with the first communication device being a child node of the fourth communication device,
    wherein the fourth communication device has a second weight different from the first weight.

11. The method of claim 10, wherein the searching for the communication devices among the plurality of communication devices that is functioning as an access point comprises:
    receiving one or more beacons or one or more probe responses from one or more of the plurality of communication devices;

determining whether a respective node number or a respective weight indicated in each of the one or more beacons or one or more of the more probe responses is same as a respective node number or same as a respective weight of a child node or a parent node of the first communication device; and identifying the fourth communication device by excluding one or more other communication devices, at least one of the one or more other communication devices being a child node of the first communication device and functioning as an access point.

12. The method of claim 10, wherein the connecting to the fourth communication device comprises rejecting connection with another communication device of the plurality of the communication devices while a connection with the fourth communication device is being established.

13. The method of claim 10, further comprising:
adopting a new first node number or the second weight for the first communication device; and
assigning a new second node number or the second weight to the second communication device by unicasting an action frame to the second communication device,
wherein at least a portion of the new second node number of the second communication device comprises the new first node number of the first communication device, and
wherein at least a portion of the new first node number comprises a node number of the fourth communication device that is unique to the fourth communication device.

14. The method of claim 13, wherein the node number of the fourth communication device comprises a media access control (MAC) address of the fourth communication device.

15. The method of claim 10, further comprising:
determining a node number of the fourth communication device; and
disconnecting from the fourth communication device in an event that at least a portion of the node number of the fourth communication device comprises the first node number of the first communication device or in an event that a weight of the fourth communication device is same as a weight of the first communication device.

16. An apparatus implementable in a first communication device of a plurality of communication devices, comprising:
a memory capable of storing a first node number or a first weight associated with the first communication device and one or more sets of instructions; and
a processor coupled to access the memory to execute the one or more instructions such that, upon executing the one or more sets of instructions, the processor is configured to perform operations comprising:
establishing a connection with a second communication device of the plurality of communication devices with the second communication device being a child node of the first communication device; and
assigning a second node number or the first weight to the second communication device,
wherein at least a portion of the second node number of the second communication device comprises the first node number of the first communication device, and
wherein at least a portion of the first node number comprises a root node number that is an identification unique to one of the plurality of communication devices as a root node in a tree structure formed by at least some of the plurality of communication devices including the first and the second communication devices.

17. The apparatus of claim 16, wherein, in assigning the second node number or the first weight to the second communication device, the processor is configured to perform operations comprising:
disconnecting from a third communication device of the plurality of communication devices with the third communication device being an original root node and the first communication device being an original child node of the original root node;
connecting to a fourth communication device of the plurality of communication devices with the fourth communication device being a new root node and the first communication device being a new child node of the new root node, the fourth communication device having a second weight different from the first weight;
adopting a new first node number or the second weight for the first communication device; and
assigning a new second node number or the second weight to the second communication device by unicasting an action frame to the second communication device,
wherein at least a portion of the new second node number of the second communication device comprises the new first node number of the first communication device, and
wherein at least a portion of the new first node number comprises a node number of the fourth communication device that is unique to the fourth communication device.

18. The apparatus of claim 16, wherein, upon executing the one or more sets of instructions, the processor is further configured to perform operations comprising:
disconnecting from a third communication device of the plurality of communication devices with the first communication device being a child node of the third communication device; and
assigning the first node number or a third weight to the first communication device,
wherein at least a portion of the second node number of the second communication device comprises the first node number of the first communication device, and
wherein the first node number comprises an identification unique to the first communication device as the root node.

19. The apparatus of claim 18, wherein, upon executing the one or more sets of instructions, the processor is further configured to perform operations comprising:
upon passage of a random length of time after the disconnecting, searching for a communication devices among the plurality of communication devices with which to establish a connection; and
connecting to a fourth communication device of the plurality of communication devices, which is not a child node of the first communication device, with the first communication device being a child node of the fourth communication device,
wherein the fourth communication device has a second weight different from the third weight,
wherein the connecting to the fourth communication device comprises rejecting connection with another communication device of the plurality of the communication devices while a connection with the fourth communication device is being established, and wherein the searching for the communication devices among the plurality of communication devices that is functioning as an access point comprises:
- receiving one or more beacons or one or more probe responses from one or more of the plurality of communication devices;
- determining whether a respective node number or a respective weight indicated in each of the one or more beacons or one or more of the more probe responses is same as a respective node number or same as a respective weight of a child node or a parent node of the first communication device; and
- identifying the fourth communication device by excluding one or more other communication devices, each of the one or more other communication devices being a child node of the first communication device and functioning as an access point.

20. The apparatus of claim 19, wherein, upon executing the one or more sets of instructions, the processor is further configured to perform operations comprising:
- adopting a new first node number or the second weight for the first communication device; and
- assigning a new second node number or the second weight to the second communication device by unicasting an action frame to the second communication device,
- wherein at least a portion of the new second node number of the second communication device comprises the new first node number of the first communication device, and
- wherein at least a portion of the new first node number comprises a node number of the fourth communication device that is unique to the fourth communication device.

21. The apparatus of claim 19, wherein, upon executing the one or more sets of instructions, the processor is further configured to perform operations comprising:
- determining a node number of the fourth communication device; and
- disconnecting from the fourth communication device in an event that at least a portion of the node number of the fourth communication device comprises the first node number of the first communication device.

* * * * *